(12) United States Patent
Chen

(10) Patent No.: US 8,451,798 B2
(45) Date of Patent: May 28, 2013

(54) CARRIER CONFIGURATION METHOD FOR MULTI-CARRIER COMMUNICATION SYSTEM

(75) Inventor: Chun-Chia Chen, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 350 days.

(21) Appl. No.: 12/818,172

(22) Filed: Jun. 18, 2010

(65) Prior Publication Data

US 2010/0322175 A1 Dec. 23, 2010

Related U.S. Application Data

(60) Provisional application No. 61/218,218, filed on Jun. 18, 2009.

(51) Int. Cl.
*H04W 4/00* (2009.01)
(52) U.S. Cl.
USPC ........................................................ 370/331
(58) Field of Classification Search
USPC .................................. 370/328, 242, 331, 329
See application file for complete search history.

(56) References Cited

U.S. PATENT DOCUMENTS

| | | | | |
|---|---|---|---|---|
| 7,158,907 | B1 * | 1/2007 | Soldo ............................ | 702/108 |
| 7,206,651 | B2 * | 4/2007 | Takemura et al. ............... | 700/94 |
| 2004/0100913 | A1 | 5/2004 | Kalliokulju et al. | |
| 2009/0316575 | A1 | 12/2009 | Gholmieh et al. | |
| 2010/0303039 | A1 * | 12/2010 | Zhang et al. ................... | 370/331 |
| 2010/0322175 | A1 * | 12/2010 | Chen .............................. | 370/329 |
| 2011/0038271 | A1 * | 2/2011 | Shin et al. ...................... | 370/252 |
| 2011/0105107 | A1 * | 5/2011 | Kwon et al. ............... | 455/422.1 |
| 2012/0051306 | A1 * | 3/2012 | Chung et al. .................. | 370/329 |
| 2012/0087314 | A1 * | 4/2012 | Maeda et al. .................. | 370/328 |
| 2012/0182879 | A1 * | 7/2012 | Tamura et al. ................ | 370/242 |

FOREIGN PATENT DOCUMENTS

| | | |
|---|---|---|
| CN | 1604547 | 4/2005 |
| CN | 1859057 | 11/2006 |
| CN | 101087289 | 12/2007 |
| CN | 101112005 | 1/2008 |
| EP | 2073427 | 6/2009 |

OTHER PUBLICATIONS

3GPP TS 36.321 V8.5.0 (Mar. 2009) 3rd Generation Partnership Project; Technical Specification Group Radio Access Network; Evolved Universal Terrestrial Radio Access (E-UTRA) Medium Access Control (MAC) protocol specification (Release 8). 3GPP TS 36.331 V8.5.0 (Mar. 2009) 3rd Generation Partnership Project; Technical Specification Group Radio Access Network; Evolved Universal Terrestrial Radio Access (E-UTRA) Radio Resource Control (RRC); protocol specification (Release 8).
"First Office Action of China counterpart application" issued on Jul. 3, 2012, p. 1-p. 6, in which the listed references were cited.

* cited by examiner

*Primary Examiner* — Fan Ng
(74) *Attorney, Agent, or Firm* — Jianq Chyun IP Office

(57) ABSTRACT

A carrier configuration method for a multi-carrier communication system having a base station (BS) and a terminal is described. The BS divides multiple component carriers (CCs) of the terminal to multiple CC groups, wherein the CCs using at least one identical configuration parameter are divided into the same CC group. The BS transmits a CC configuration message comprising at least one configuration parameter data to the terminal, wherein the configuration message comprises or does not comprise at least one CC configuration indicator. If the configuration message comprises the CC configuration indicator, the terminal will receive the CC configuration message, and configure the configuration parameter of the configurations of the CCs indicated by the CC configuration indicator according to the configuration parameter data; otherwise, the terminal will configure the configuration parameter of the configurations of the default CCs (e.g. all of the CCs currently used by the terminal, or primary CCs).

26 Claims, 13 Drawing Sheets

```
Indicator-Field1
MAC-MainConfiguration ::= SEQUENCE {
    dl-SCH-Configuration         SEQUENCE {
    }
    ┌─────────────────────────────────────────────┐
    │ Indicator-Field2                            │
    │ ul-SCH-Configuration        SEQUENCE {      │ ─── A1
    │   maxHARQ-Tx                                │
    │   periodicBSR-Timer                         │
    │   retxBSR-Timer                             │
    │   ttiBundling               BOOLEAN         │ ─── A2
    │ }                                           │
    └─────────────────────────────────────────────┘
    ┌─────────────────────────────────────────────┐
    │ Indicator-Field3                            │
    │ drx-Configuration           CHOICE {        │
    │   disable                   NULL,           │
    │   enable                    SEQUENCE {      │
    │     onDurationTimer                         │
    │     drx-InactivityTimer                     │
    │   ┌───────────────────────────────────────┐ │ ─── A3
    │   │ Indicator-Field4                      │ │
    │   │ drx-RetransmissionTimer               │ │
    │   │ longDRX-CycleStartOffset              │ │
    │   │ },                                    │ │
    │   │ shortDRX?           CHOICE {          │ │
    │   │   disable                             │ │
    │   │   enable            SEQUENCE {        │ │
    │   │     shortDRX-Cycle                    │ │
    │   │     drxShortCycleTimer                │ │ ─── A4
    │   │   }                                   │ │
    │   │ }      }                              │ │
    │   └───────────────────────────────────────┘ │
    │ }                                           │
    └─────────────────────────────────────────────┘
    timeAlignmentTimerDedicated     TimeAlignmentTimer,
    ... [skip] ...
}
```

FIG. 10

```
Indicator-Field1
MAC-MainConfiguration ::=  SEQUENCE {
    dl-SCH-Configuration          SEQUENCE {
    }
    ┌─────────────────────────────────────────────┐
    │ Indicator-Field2                            │
    │ ul-SCH-Configuration         SEQUENCE {     │──B1
    │   maxHARQ-Tx                                │
    │   periodicBSR-Timer                         │──B2
    │   retxBSR-Timer                             │
    │   ttiBundling                BOOLEAN        │
    │ }                                           │
    └─────────────────────────────────────────────┘
    ┌─────────────────────────────────────────────┐
    │ Indicator-Field3                            │
    │ ul-SCH-Configuration         SEQUENCE {     │
    │   maxHARQ-Tx                                │
    │   periodicBSR-Timer                         │
    │   retxBSR-Timer                             │──B3
    │   ttiBundling                BOOLEAN        │
    │ }                                           │
    └─────────────────────────────────────────────┘
    timeAlignmentTimerDedicated   TimeAlignmentTimer,
    ... [skip] ...
}
```

FIG. 11

CARRIER CONFIGURATION METHOD FOR MULTI-CARRIER COMMUNICATION SYSTEM

CROSS-REFERENCE TO RELATED APPLICATION

This application claims priority benefits of U.S. Patent Provisional Application No. 61/218,218, filed on Jun. 18, 2009. The entirety of the above-mentioned patent applications is hereby incorporated by reference herein and made a part of this specification.

BACKGROUND

1. Field of the Disclosure

The disclosure relates to a multi-carrier communication system. More particularly, the disclosure relates to a carrier configuration method for a multi-carrier communication system.

2. Description of Related Art

A multi-carrier terminal may transmit and/or receive a plurality of packets through one or a plurality of component carriers (CCs). To control the CCs to achieve different functions, a base station (BS) may set a specific configuration of the CCs of each terminal. For example, the BS may set a configuration of the CCs of the terminal to achieve discontinuous reception (DRX) or semi-persistent scheduling (SPS), wherein the DRX configuration and the SPS configuration are two different configurations, and could simultaneously exist, that is, not merely one of them could exist meanwhile. If the CCs of the terminal uses the DRX configuration, the CCs of the terminal could be waked up or enter a dormant mode according to parameters in the DRX configuration.

Presently, a plurality of configuration methods is provided for the BS to set the configuration of the CCs of the terminal. In one of the above configuration methods, all of the CCs of the terminal are set to use an identical configuration, and such configuration method is also referred to as an identical configuration method. According to such configuration method, sizes of a plurality of CC configuration messages transmitted between the BS and the terminals could be reduced. However, since all of the CCs have the same configuration, such configuration method is lack of flexibility. For example, when a data transmitting rate is relatively low or is limited, the terminal probably only requires some CCs to be waked up during scheduled or deployed DRX cycles for receiving data. However, other CCs that do not require a scheduled data service are also waked up according to such method. In other words, the identical configuration method may lead to relatively more power consumption of the terminal.

Moreover, another configuration method, called an independent configuration method, is provided, by which an individual configuration is set to each CC. According to such configuration method, each CC could be flexibly controlled, though compared to the identical configuration method, relatively more CC configuration messages are probably required. Therefore, such configuration method may consume relatively more radio resources and/or relatively more power to transmit these CC configuration messages.

Regarding the DRX, a configuration method based on an anchor carrier having a notification message is provided. In such configuration method, only the anchor carrier is set to the DRX configuration, and the other CCs are all in the dormant mode until the terminal receives a notification message through the anchor carrier. In other words, when the terminal receives the notification message, the corresponding CC by indicated by the notification message is waked up.

Referring to FIGS. 1A-1C, FIG. 1A is a schematic diagram illustrating configurations of CCs when an identical configuration method is applied, FIG. 1B is a schematic diagram illustrating configurations of CCs when an independent configuration method is applied, and FIG. 1C is a schematic diagram illustrating configurations of CCs when a configuration method based on an anchor carrier having a notification message is applied.

According to FIG. 1A, when the identical configuration method is applied, the CCs CC1-CC3 all use the same DRX configuration, wherein the CCs CC1-CC3 are waked up during time intervals t1-t2, t3-t4 and t5-t6, and are in the dormant mode during other time intervals, wherein the DRX cycle is a time length between time points t1 and t3.

According to FIG. 1B, when the independent configuration method is used, the CCs CC1-CC3 respectively use individual DRX configurations of DRX_CONFIG_1-DRX_CONFIG_3. The CC CC1 is waked up during time intervals t1-t2, t3-t4 and t5-t6, and is in the dormant mode during other time intervals. The CC CC2 is waked up during time intervals t7-t8, t9-t10, t11-t12, t13-t14, t15-t16 and t17-t18, and is in the dormant mode during the other time intervals. The CC CC3 is waked up during time intervals t1-t2 and t5-t6, and is in the dormant mode during other time intervals. Compared to the identical configuration method, the independent configuration method requires relatively more or large carrier configuration messages.

According to FIG. 1C, when the configuration method based on an anchor carrier having a notification message is used, the CC CC1 may serve as the anchor carrier, and only the anchor carrier CC1 is set to the DRX configuration. The CC CC1 is waked up during the time intervals t1-t2, t3-t4 and t5-t6, and is in the dormant mode during the other time intervals. At a time point t7, the terminal receives a notification message for waking up the CC CC2 through the anchor carrier CC1, so that the CC CC2 is waked up during the time interval t7-t4, and is in the dormant mode during the other time intervals. In this example, the CC CC3 is not waked up and is always in the dormant mode. The configuration method based on the anchor carrier having the notification message does not require relatively more or relatively large carrier configuration message as that required by the independent configuration method, and compared to the identical configuration method, only some extra notification messages are added.

SUMMARY

An exemplary embodiment of the disclosure provides a carrier configuration method for a multi-carrier communication system having a base station (BS) and a terminal. The BS divides a plurality of component carriers (CCs) of the terminal to a plurality of CC groups, wherein the CCs using at least one identical configuration parameter are divided into the same CC group. The BS transmits a CC configuration message to the terminal, wherein the CC configuration message comprises at least one configuration parameter data, and comprises or does not comprise at least one CC group indicator, the CC group indicator indicates the CCs of the same CC group, and corresponds to at least the configuration parameter data. The terminal receives the CC configuration message. If the CC configuration message comprises the CC group indicator, the terminal will configure the configuration parameter of configurations of the CCs indicated by the CC configuration indicator according to the configuration parameter data.

If the CC configuration message does not comprise the CC group indicator, the terminal will configure the configuration parameter of configurations of default CCs (e.g. all of the CCs currently used by the terminal, or primary CCs) according to the configuration parameter data by the terminal.

An exemplary embodiment of the disclosure provides a carrier configuration method for a multi-carrier communication system having a base station (BS) and a terminal. The BS selected one of a plurality of component carriers (CCs) to serve as an anchor carrier. The BS transmits a CC configuration message to the terminal, so that the terminal sets a configuration of the anchor carrier according to the CC configuration message. When data of at least one of the CCs other than the anchor carrier is to be received, the BS transmits a resource allocation message to the tell rural through the anchor carrier when the anchor carrier is waked up, wherein the resource allocation message (may including CC identification and the resource allocation information) indicates the CC through which the data is to be received. After the terminal receives the resource allocation message, the terminal wakes up the CC indicated by the resource allocation message after the anchor carrier is waked up for a period of delay time.

According to the above descriptions, in the carrier configuration method of the disclosure, the CCs using at least one identical configuration parameter are divided into the same CC group, and the BS can transmit the CC configuration message to the terminal, so that the terminal can set the configuration parameters of each CC in the CC group while taking the CC group as a unit. In this way, a size and amount of the CC configuration message transmitted between the BS and the terminal can be reduced. Moreover, an exemplary embodiment of the disclosure further provides a carrier configuration method based on an anchor carrier having a resource allocation message, by which the terminal can wake up the CC of the data to be received according to the resource allocation message. In this way, an additional notification message may be not needed. Besides, the above carrier configuration methods can also be applied to a 3GPP system, for example, UMTS, LTE or LTE-A, etc.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 10 is a schematic diagram illustrating a plurality of configuration parameter data of a CC configuration message according to another exemplary embodiment of the disclosure.

FIG. 11 is a schematic diagram illustrating a plurality of configuration parameter data of a CC configuration message according to still another exemplary embodiment of the disclosure.

DETAILED DESCRIPTION OF DISCLOSED EMBODIMENTS

Each conventional carrier configuration method has its advantages and shortages. To reduce a size of a component carrier (CC) configuration message transmitted between a base station (BS) and a terminal, and achieve flexibility of the carrier configuration method, an exemplary embodiment of the disclosure provides a carrier configuration method, by which the CCs using an identical configuration are divided into a same CC group, and the BS sets the configuration of the CCs while taking the CC group as a unit. Moreover, an exemplary embodiment of the disclosure further provides a carrier configuration method based on an anchor carrier having a resource allocation message, which can be applied for discontinuous reception (DRX) or semi-persistent scheduling (SPS). In this way, according to the carrier configuration methods provided by the exemplary embodiments of the disclosure, extra transmission and processing of radio resource control messages can be reduced.

Figure 1A:
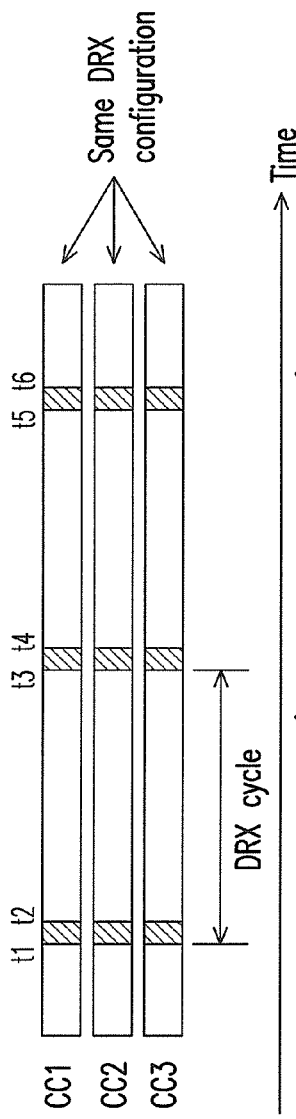
FIG. 1A is a schematic diagram illustrating configurations of component carriers (CCs) when an identical configuration method is applied.
Figure 1B:
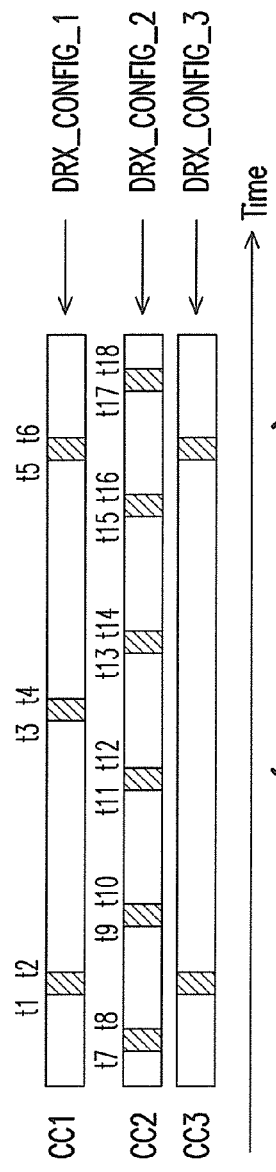
FIG. 1B is a schematic diagram illustrating configurations of CCs when an independent configuration method is applied.
Figure 1C:
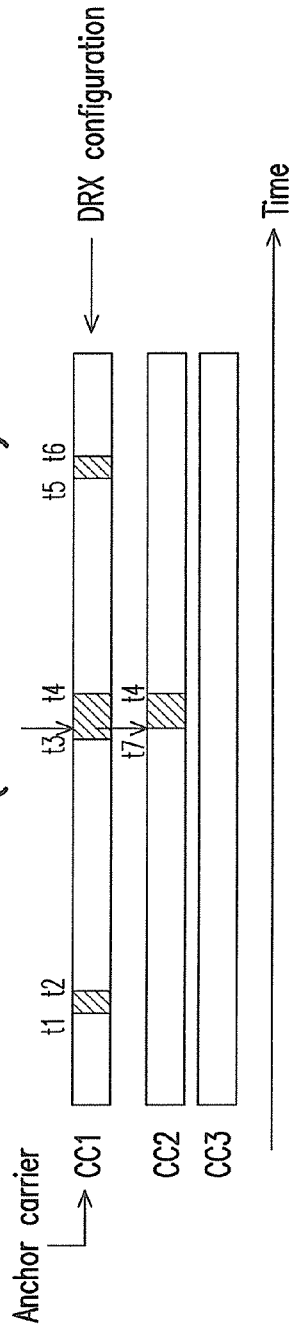
FIG. 1C is a schematic diagram illustrating configurations of CCs when a configuration method based on an anchor carrier having a notification message is applied.
Figure 2:
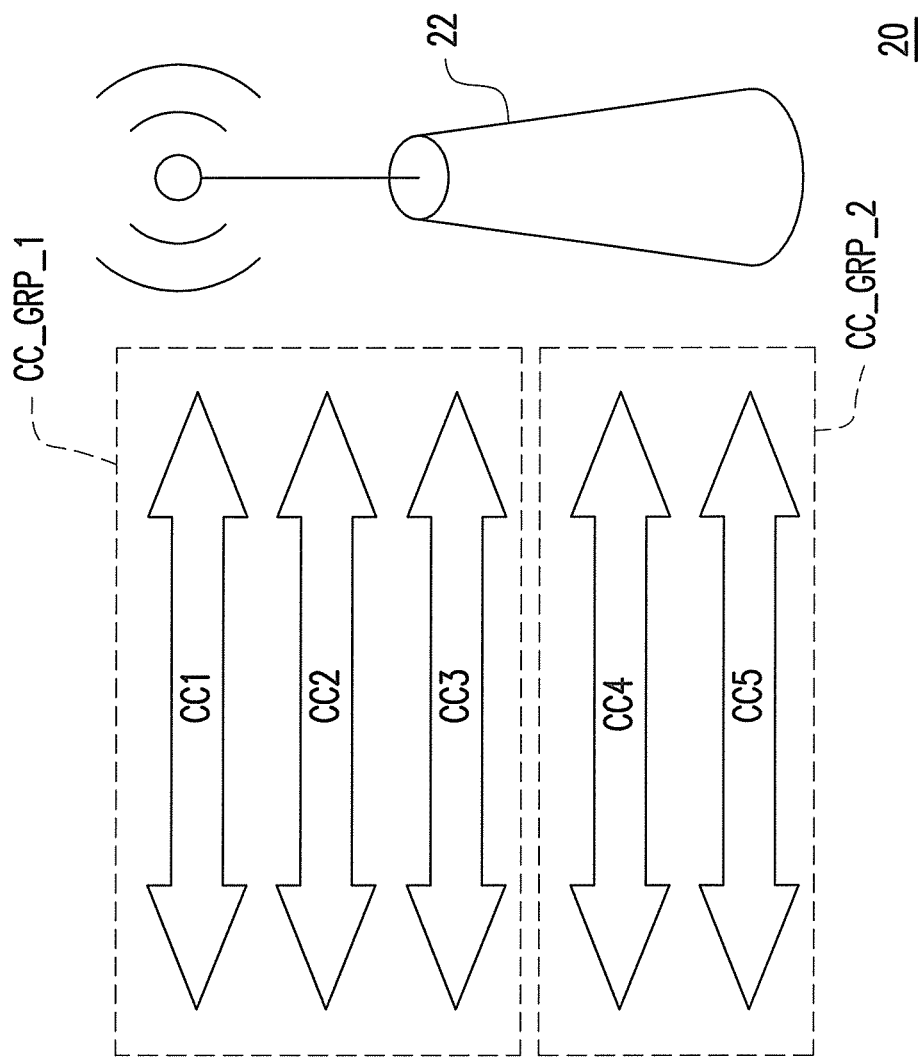
FIG. 2 is a system block diagram illustrating a multi-carrier communication system according to an exemplary embodiment of the disclosure.

Referring to FIG. 2, FIG. 2 is a system block diagram illustrating a multi-carrier communication system according to an exemplary embodiment of the disclosure. The multi-carrier communication system 20 includes a BS 22 and a terminal 24, and communication transmission between the terminal 24 and the BS 22 can be performed through a plurality of CCs CC1-CC5. To achieve effective allocation of the radio resources and perform various possible transmission operations, the BS 22 sets configuration parameters of the configurations of the CCs CC1-CC5 of the terminal 24. Moreover, the multi-carrier communication system 20 can be a 3GPP system, which is, for example, UMTS, LTE or LTE-A, etc.

Figure 3:
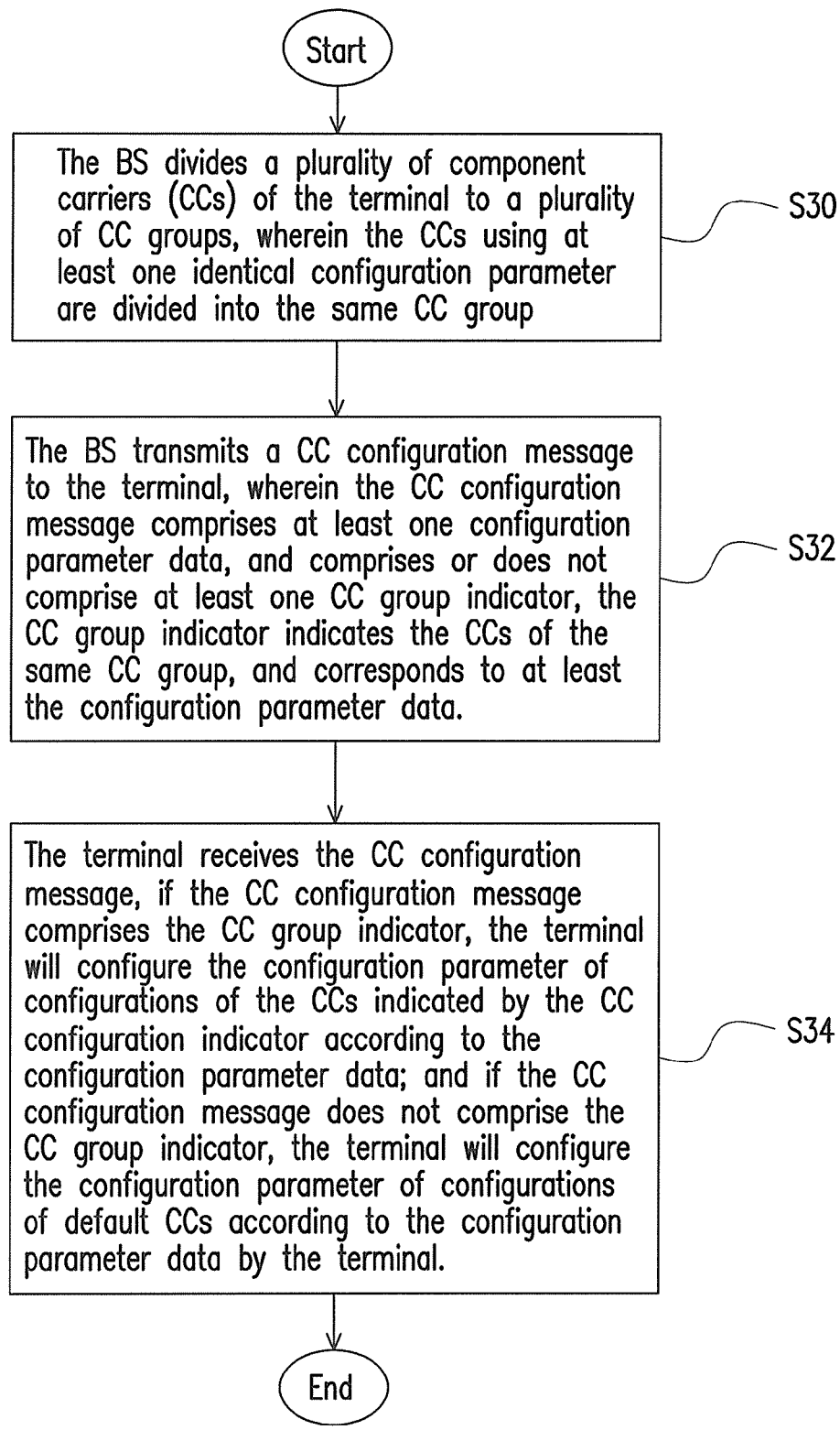
FIG. 3 is a flowchart illustrating a carrier configuration method according to an exemplary embodiment of the disclosure.

Referring to FIG. 3, FIG. 3 is a flowchart illustrating a carrier configuration method according to an exemplary embodiment of the disclosure. In step S30, the BS divides a plurality of CCs of the terminal to a plurality of CC groups, wherein the CCs using at least one identical configuration parameter are divided into the same CC group. In step S32, the BS transmits a CC configuration message to the terminal, wherein the CC configuration message comprises at least one configuration parameter data, and comprises or does not comprise at least one CC group indicator, the CC group indicator indicates the CCs of the same CC group, and corresponds to at least the configuration parameter data. In step S34, the terminal receives the CC configuration message, if the CC configuration message comprises the CC group indicator, the terminal will configure the configuration parameter of configurations of the CCs indicated by the CC configuration indicator according to the configuration parameter data; and if the CC configuration message does not comprise the CC group indicator, the terminal will configure the configuration parameter of configurations of default CCs (e.g. all of the CCs currently used by the terminal, or primary CCs) according to the configuration parameter data by the terminal. The primary CC is specified in the currently used standard, and is the CC which the terminal primarily uses.

Referring to FIG. 2 again, a simple example is provided below to introduce the carrier configuration method of FIG. 3. In the CCs CC1-CC5, it is assumed that the CCs CC1-CC3 use the same configuration, i.e. all of the configuration parameters of the configuration of the CC CC1 are the same to all of the configuration parameters of the configurations of the CCs CC2 and CC3. Besides, the CCs CC4 and CC5 use the same configuration. Then, in the steps S30, the BS 22 divides the CCs CC1-CC3 into a first CC group CC_GRP_1, and divides the CCs CC4 and CC5 into a second CC group CC_GRP_2.

Then, in the step S32, the BS 22 transmits a CC configuration message to the terminal 24, wherein the CC configuration message comprises a first and a second CC group indicators and a first and a second configuration parameter data respectively corresponding to the first and the second CC group indicators. The first CC group indicator indicates the CCs CC1-CC3 of the first CC group CC_GRP_1, and the second CC group indicator indicates the CCs CC4 and CC5 of the second CC group CC_GRP_2. The first configuration parameter data includes a plurality of configuration parameters of the first CC group CC_GRP_1, and the second configuration parameter data includes a plurality of configuration parameters of the second CC group CC_GRP_2.

Then, in the step S34, the terminal 24 receives the CC configuration message, and configures the configuration parameters of the configuration of the CCs CC1-CC3 indicated by the first CC configuration indicator according to the first configuration parameter data, and configures the configuration parameters of the configuration of the CCs CC4 and CC5 indicated by the second CC configuration indicator according to the second configuration parameter data.

Figure 4:
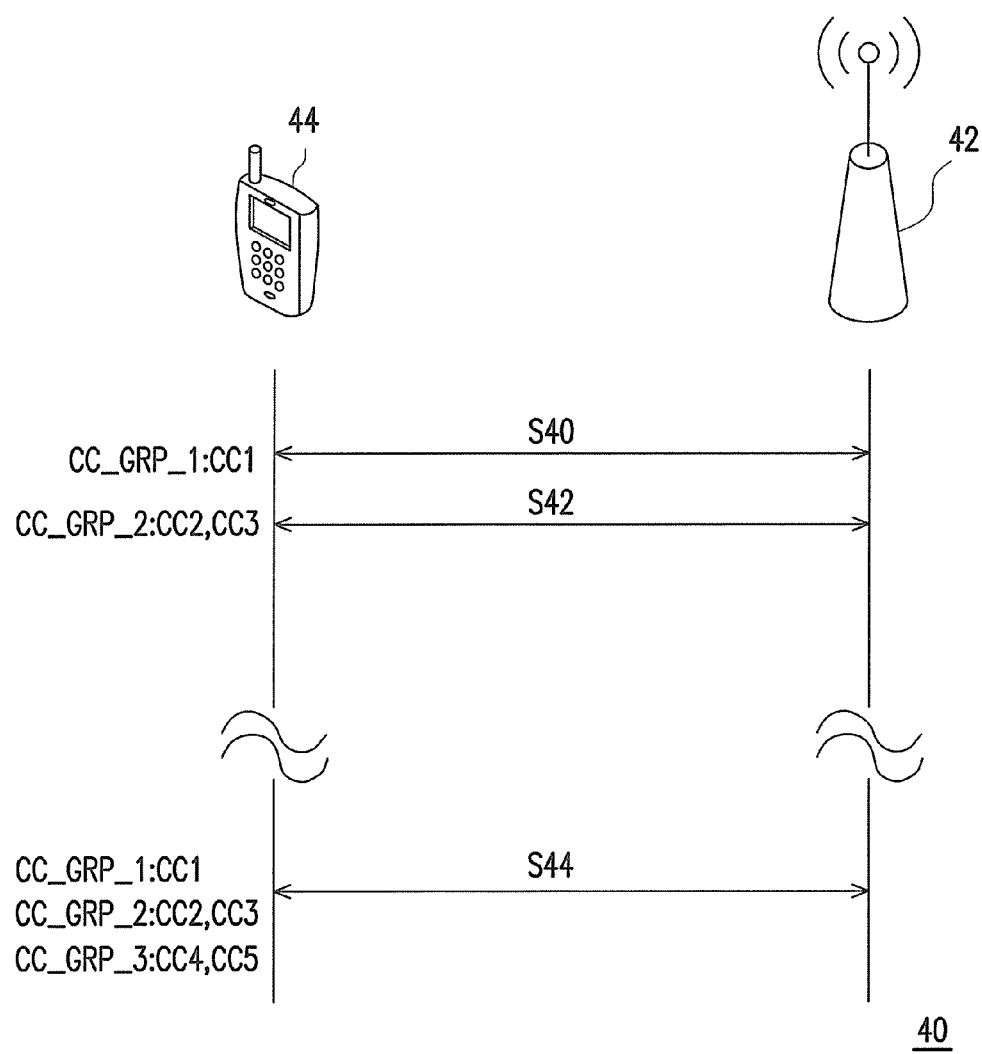
FIG. 4 is a schematic diagram illustrating a process that a multi-carrier communication system sets and resets configurations of various CCs according to an exemplary embodiment of the disclosure.

Referring to FIG. 4, FIG. 4 is a schematic diagram illustrating a process that a multi-carrier communication system sets and resets configurations of various CCs according to an exemplary embodiment of the disclosure. The multi-carrier communication system 40 includes a BS 42 and a terminal 44. First, in step S40, the terminal 44 and the BS 42 perform a link setting to establish a link there between. If the multi-carrier communication system 40 is a 3 GPP system, a link setting method of the step S40 is the same to a link setting method specified by the 3GPP standard.

When the BS 42 uses the CCs CC1-CC3 to transmit data to the terminal 44, the BS 42 divides the CCs CC1-CC3 into different CC groups. In the present exemplary embodiment, since the configurations of the CCs CC2 and CC3 have the same configuration parameters, though the configuration of the CC CC1 has the configuration parameters different to that of the configurations of the CCs CC2 and CC3, the CC CC1 is divided into the first CC group CC_GRP_1, and the CCs CC2 and CC3 are divided into the second CC group CC_GRP_2. In the step S42, the BS 42 transmits a CC configuration message to the terminal, and after the terminal 44 receives the CC configuration message, the terminal 44 sets the configuration of the CC CC1 to a first configuration, and sets the configurations of the CCs CC2 and CC3 to a second configuration, wherein the configuration parameters of the first and the second configurations are respectively recorded in the first and the second configuration parameter data.

After a period of time, in step S44, the BS 42 uses the CCs CC1-CC5 to transmit data to the terminal 44. Now, the BS 42 has to reset the configurations of the CCs CC1-CC5. The BS 42 divides the CCs CC1-CC5 into different CC groups. In the present exemplary embodiment, since configurations of the CCs CC2 and CC3 have the same configuration parameters, configurations of the CCs CC4 and CC5 have the same configuration parameters, and configuration of the CC CC1 has configuration parameters different to that of the configurations of the CCs CC2-CC5, the CC CC1 is divided into the first CC group CC_GRP_1, the CCs CC2 and CC3 are divided into the second CC group CC_GRP_2, and the CCs CC4 and CC5 are divided into a third CC group CC_GRP_3. In the step S44, the BS 42 transmits a CC configuration message to the terminal 44, and after the terminal 44 receives the CC configuration message, the terminal 44 sets the configuration of the CC CC1 to a third configuration, sets the configurations of the CCs CC2 and CC3 to a fourth configuration, and sets the configurations of the CCs CC4 and CC5 to a fifth configuration, wherein the configuration parameters of the third to the fifth configurations are respectively recorded in the third to the fifth configuration parameter data.

Moreover, it should be noticed that when the configurations of the CCs CC1-CC5 are reset, the transmitted configuration parameter of each of the third to the fifth configuration parameter data can be a difference between a current configuration parameter and a pervious configuration parameter. Moreover, if the difference between the current configuration parameter and the pervious configuration parameter is 0, the difference between the current configuration parameter and the pervious configuration parameter is not included in the third to the fifth configuration parameter data. Besides, if an initial value of the previous configuration parameter is 0, the difference between the current configuration parameter and the pervious configuration parameter can be an absolute value of the current configuration parameter.

Moreover, in another exemplary embodiment, when the configurations of the CCs CC1-CC5 are reset, the transmitted configuration parameter of each of the third to the fifth configuration parameter data can be the absolute value of the current configuration parameter. Moreover, if the current configuration parameter is the same to the previous configuration parameter, the absolute value of the current configuration parameter is not included in the third to the fifth configuration parameter data.

For example, the first and the second configuration parameter data include configuration parameters of on durations and DRX cycles, etc., wherein after the terminal 44 receives the first and the second configuration parameter data, the on duration and the DRX cycle of the CC CC1 are set to 200 µs and 50 µs, and the on duration and the DRX cycle of the CCs CC2 and CC3 are set to 100 µs and 25 µs. When the configurations of the CCs CC1-CC5 are reset, the BS 42 sets the on duration and the DRX cycle of the CC CC1 to 250 µs and 100 µs, sets the on duration and the DRX cycle of the CCs CC2 and CC3 to 100 µs and 50 µs, and sets the on duration and the DRX cycle of the CCs CC4 and CC5 to 100 µs and 25 µs.

Therefore, if the above recording method of recording the difference is used, the third configuration parameter data records a difference between a current on duration and a previous on duration to be 50 µs, and records a difference between a current DRX cycle and a previous DRX cycle to be 50 µs. The fourth configuration parameter data records the difference between the current on duration and the previous on duration to be 0 µs, or does not record the difference between the current on duration and the previous on duration, and records the difference between the current DRX cycle and the previous DRX cycle to be 25 µs. Moreover, the fifth configuration parameter data records the difference between the current on duration and the previous on duration to be 100 µs, and records the difference between the current DRX cycle and the previous DRX cycle to be 25 µs.

In the above exemplary embodiment, if the above recording method of recording the absolute value is used, the third configuration parameter data records an absolute value of a current on duration to be 250 µs, and records an absolute value of a current DRX cycle to be 100 µs. Moreover, the fourth configuration parameter data records the absolute value of the current on duration to be 100 µs, or does not record the absolute value of the current on duration, and records the absolute value of the current DRX cycle to be 50 µs. The fifth configuration parameter data records the absolute value of the current on duration to be 100 µs, and records the absolute value of the current DRX cycle to be 25 µs.

Besides, in the exemplary embodiment of the disclosure, there is another recording method of the configuration parameter data. When the CC configuration message includes the first and the second CC group indicators and the first and the second configuration parameter data respectively corresponding to the first and the second CC group indicators, the configuration parameter recorded by the first configuration parameter data can be regarded as a reference configuration parameter. If the second configuration includes the same type of configuration parameter as that of the first configuration, the second configuration parameter data can record a difference between the current configuration parameter and the configuration parameter in the first configuration parameter data. If the difference between the current configuration parameter and the configuration parameter in the first configuration parameter data is 0, it may be not included in the second configuration parameter data. That is, the second configuration data records the difference between the current configuration parameter and the configuration parameter in the first configuration parameter data, and records absolute value of the different type of the configuration parameter which is not recorded in the first configuration parameter data.

In addition, in another exemplary embodiment, when the CC configuration message comprises a first through $x^{th}$ CC group indicators and a first through $x^{th}$ configuration parameter data respectively corresponding to the first through $x^{th}$ CC group indicators, wherein x is an integer larger than or equal to 2. The first configuration parameter data is referenced by the other plurality of configuration parameter data. In other word, when the second through $x^{th}$ configuration parameter data have the same type of the configuration parameters included in first configuration parameter data, the second through $x^{th}$ configuration parameter data record the differences between the configuration parameters in the configurations and the corresponding configuration parameter included in the first configuration parameter data. If the differences between the configuration parameters in the configurations and the corresponding configuration parameter included in the first configuration parameter data are 0, the differences may be not included in the he second through $x^{th}$ configuration parameter data.

For example, the first and the second configuration parameter data include configuration parameters of the on durations and the DRX cycles, etc., wherein after the terminal 44 receives the first and the second configuration parameter data, the on duration and the DRX cycle of the CC CC1 are set to 200 µs and 50 µs, and the on duration and the DRX cycle of the CCs CC2 and CC3 are set to 200 µs and 25 µs. If the above recording method of regarding the configuration parameter recorded by the first configuration parameter data as the reference configuration parameter is used, the first configuration parameter data records the absolute values of the on duration and the DRX cycle as 200 µs and 50 µs. Moreover, the second configuration parameter data records a difference between its on duration and the on duration of the first configuration parameter data to be 0, or does not record the difference between its on duration and the on duration of the first configuration parameter data, and records a difference between its DRX cycle and the DRX cycle of the first configuration parameter data to be 25 µs.

In addition, there is another recording method of the configuration parameter data of the exemplary embodiment of the disclosure. When the CC configuration message includes the first and the second CC group indicators and the first and the second configuration parameter data respectively corresponding to the first and the second CC group indicators, the configuration parameter recorded by the first configuration parameter data can be regarded as a reference configuration parameter. If the second configuration includes the same type of configuration parameter as that of the first configuration, and the absolute values thereof are the same, the second configuration parameter data does not record the absolute value of this configuration parameter. The second configuration parameter data only records an absolute value of a configuration parameter that is not recorded by the first configuration parameter data or an absolute value of a different configuration parameter.

For example, the first and the second configuration parameter data include configuration parameters of the on durations and the DRX cycles, etc., wherein after the terminal 44 receives the first and the second configuration parameter data, the on duration and the DRX cycle of the CC CC1 are set to 200 µs and 50 µs, and the on duration and the DRX cycle of the CCs CC2 and CC3 are set to 200 µs and 25 µs. If the above recording method of regarding the configuration parameter recorded by the first configuration parameter data as the reference configuration parameter is used, the first configuration parameter data records the absolute values of the on duration and the DRX cycle to be 200 µs and 50 µs. Moreover, the second configuration parameter data only records the absolute value of the DRX cycle to be 25 µs, and does not record the absolute value of the on duration.

According to the above descriptions, a situation that the second configuration parameter data further includes information of a time alignment timer is considered. After the terminal 44 receives the second configuration parameter data, if the time alignment timer of the CCs CC2 and CC3 is 20 µs, the second configuration parameter data further records an absolute value of the time alignment timer to be 20 μs. In other words, the first configuration parameter data can be referred by the other configuration parameter data, so that data amount of the CC configuration messages transmitted between the BS 42 and the terminal 44 can be reduced according to such recording method with simplified data amount. Moreover, since the first configuration parameter data does not have the information of the time alignment timer, the corresponding CC CC1 may use a predetermined initial value of the time alignment timer.

Figure 5:
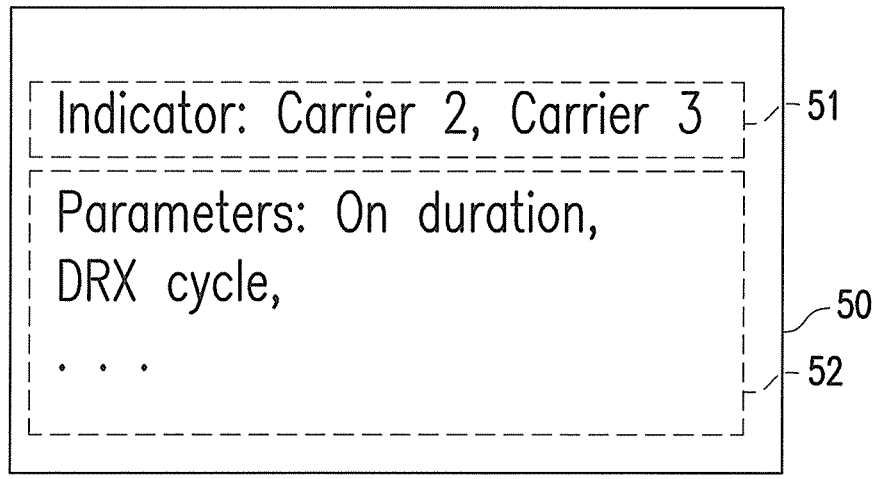
FIG. 5 is a schematic diagram illustrating a CC configuration message according to an exemplary embodiment of the disclosure.

Referring to FIG. 5, FIG. 5 is a schematic diagram illustrating a CC configuration message according to an exemplary embodiment of the disclosure. In the exemplary embodiment of FIG. 5, a CC group indicator 51 in the CC configuration message 50 uses a plurality of CC identifier to indicate the CCs of the same CC group. For example, "Indicator: Carrier2, Carrier 3" of FIG. 5 represents that the CCs CC2 and CC3 are divided into the same CC group, "Parameters: On duration, DRX cycle, . . . " represents a configuration parameter data 52, and "Parameters: On duration, DRX cycle, . . . " records the configuration parameters such as the on duration and the DRX cycle, etc. of the CCs CC2 and CC3.

Figure 6:
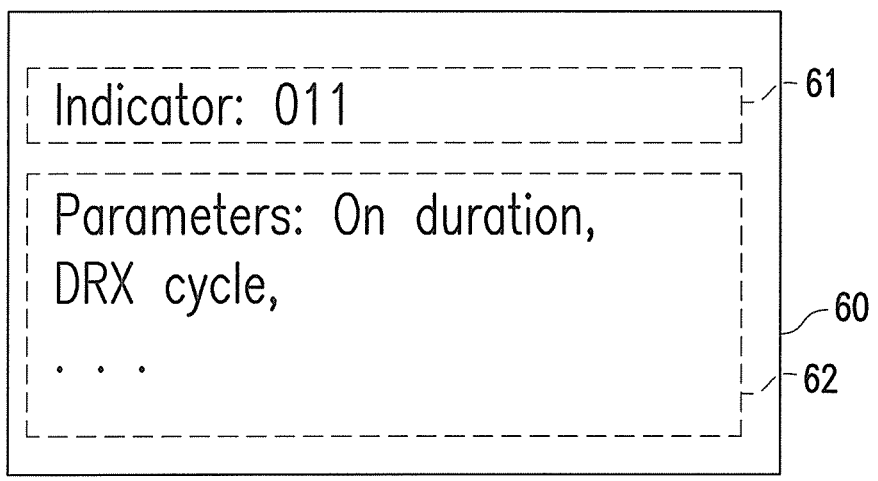
FIG. 6 is a schematic diagram illustrating a CC configuration message according to another exemplary embodiment of the disclosure.

Referring to FIG. 6, FIG. 6 is a schematic diagram illustrating a CC configuration message according to another exemplary embodiment of the disclosure. In the exemplary embodiment of FIG. 6, a CC group indicator 61 in the CC configuration message 60 uses a bitmap to indicate the CCs of the same CC group. For example, "Indicator: 011" of FIG. 6 represents that the CCs CC2 and CC3 are divided into the same CC group, "Parameters: On duration, DRX cycle, . . . " represents a configuration parameter data 62, and "Parameters: On duration, DRX cycle, . . . " records the configuration parameters such as the on duration and the DRX cycle, etc. of the CCs CC2 and CC3.

Moreover, it should be noticed that although the CC group indicator and the configuration parameter data of FIG. 5 and FIG. 6 are in the same CC configuration message, it does not mean that the CC group indicator and the configuration parameter data have to be transmitted through a same channel, or have to be combined in a same file for transmission. Conversely, in another exemplary embodiment of the disclosure, the CC group indicator and the configuration parameter data can be separately transmitted at different time and/or through different channels. In other words, the terminal 44 can respectively receive the CC group indicator and the configuration parameter data, and can configure the configuration parameters of the configurations of the CCs indicated by the CC configuration indicator according to the configuration parameter data.

Moreover, it should be noticed that the CCs can also be simultaneously divided into a plurality of the CC groups, and the CC configuration message includes a plurality of CC group indicators and a plurality of configuration parameter data corresponding to the CC group indicators. The terminal can configure the configuration parameter of the configurations of the CCs indicated by the corresponding CC configuration indicator according to each configuration parameter data. In this way, the CCs of the same CC group may probably use the same first configuration parameter, and the CCs of the same CC group may probably use different second configuration parameters.

Taking three CCs of CC1-CC3 as an example, the DRX cycle of the CC CC1 is 200 μs, and the on duration thereof is 20 μs; the DRX cycle of the CC CC2 is 200 μs, and the on duration thereof is 40 μs; and the DRX cycle of the CC CC3 is 400 μs, and the on duration thereof is 20 μs. Therefore, the BS divides the CCs CC1 and CC2 into a first CC group, divides the CCs CC1 and CC3 into a second CC group, divides the CC CC2 into a third CC group, and divides the CC CC3 into a fourth CC group. The CC configuration message includes a first to a fourth CC group indicators and a first to a fourth configuration parameter data. Taking the recording method of recording the absolute value as an example, the first configuration parameter data records the absolute value of the DRX cycle to be 200 μs, the second configuration parameter data records the absolute value of the on duration to be 20 μs, the third configuration parameter data records the absolute value of the on duration to be 40 μs, and the fourth configuration parameter data records the absolute value of the DRX cycle to be 400 μs.

Moreover, the CC configuration message may further includes a common configuration parameter data, and the terminal configures a common configuration parameter of the configurations of all of the CCs according to the common configuration parameter data, wherein the common configuration parameter data is disposed in front of the CC group indicator, and the configuration parameter data corresponding to the CC group indicator is disposed behind the CC group indicator.

For example, taking three CCs of CC1-CC3 as an example, the DRX cycle of the CC CC1 is 200 μs, and the on duration thereof is 20 μs; the DRX cycle of the CC CC2 is 200 μs, and the on duration thereof is 40 μs; and the DRX cycle of the CC CC3 is 200 μs, and the on duration thereof is 20 μs. The CCs CC1-CC3 have the common DRX cycle, so that the BS groups the CCs CC1-CC3 according to different on durations. The BS divides the CCS CC1 and CC3 into a first CC group, and divides the CC CC2 into a second CC group. The CC configuration message includes the common configuration parameter data, a first and second CC group indicators, and a first and a second configuration parameter data. Taking the recording method of recording the absolute value as an example, the common configuration parameter data records the absolute value of the DRX cycle to be 200 μs, the first configuration parameter data records the absolute value of the on duration to be 20 μs, and the second configuration parameter data records the absolute value of the on duration to be 40 μs.

Besides, in another exemplary embodiment, the CC group indicators are arranged in a hierarchy approach, and the terminal configures the configuration parameters of the configurations of the CCs indicated by the CC configuration indicators according to the configuration parameter data based on the hierarchy approach.

Figure 7:
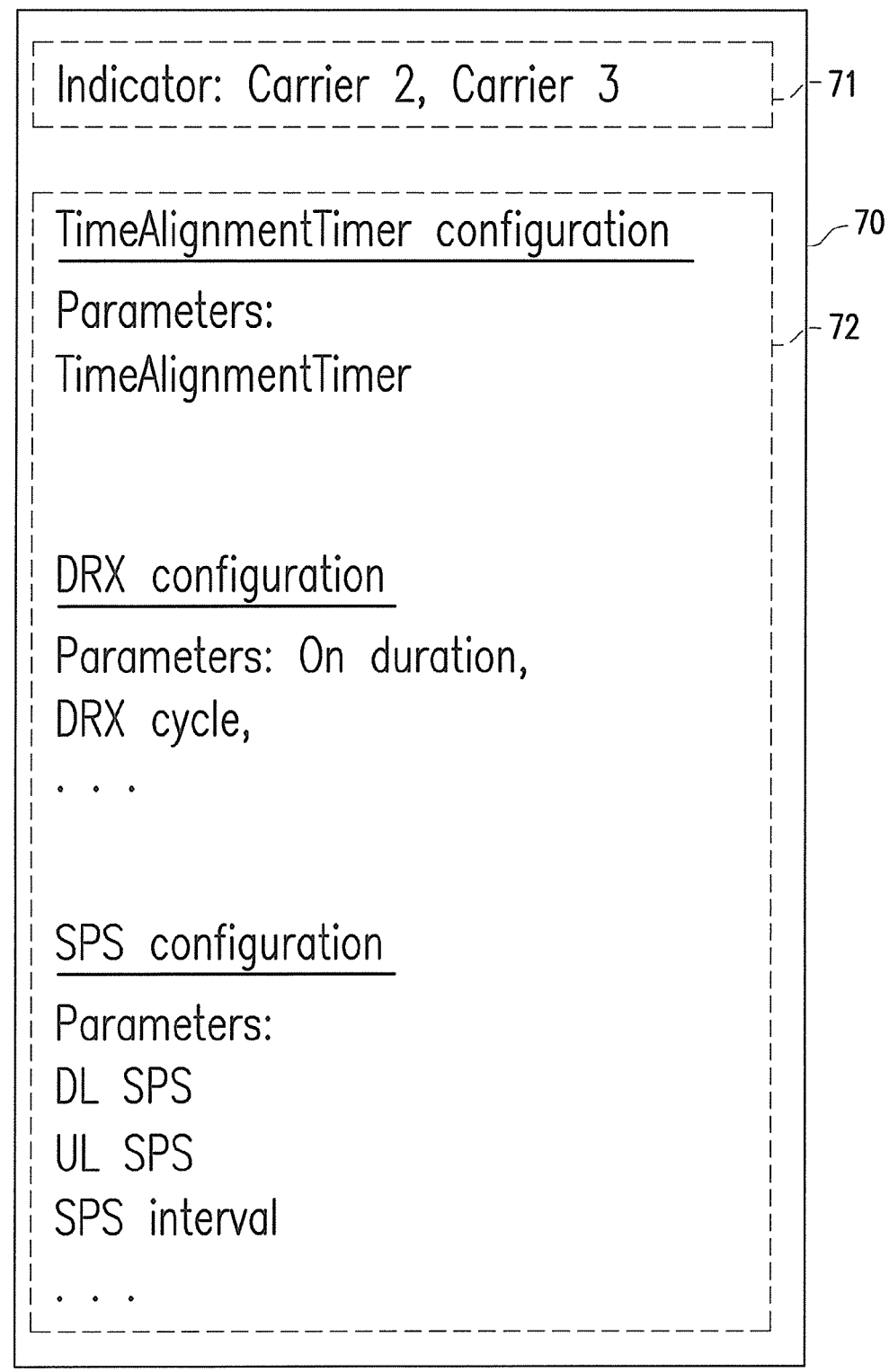
FIG. 7 is a schematic diagram illustrating a CC configuration message according to still another exemplary embodiment of the disclosure.

Referring to FIG. 7, FIG. 7 is a schematic diagram illustrating a CC configuration message according to still another exemplary embodiment of the disclosure. In FIG. 7, the CC configuration message 70 includes a CC group indicator 71 and a configuration parameter data 72 corresponding to the CC group indicator 71. The configuration parameter data 72 records descriptions of various configuration types and parameter data of these configuration types, and the configuration parameter data 72 corresponds to the CC group indicator 71. The CC group indicator 71 is disposed in front of the configuration parameter data 72. In the present exemplary embodiment, the CCs CC2 and CC3 may use the same time alignment timer configuration, the DRX configuration and the SPS configuration recorded by the configuration parameter data 72.

Figure 8:
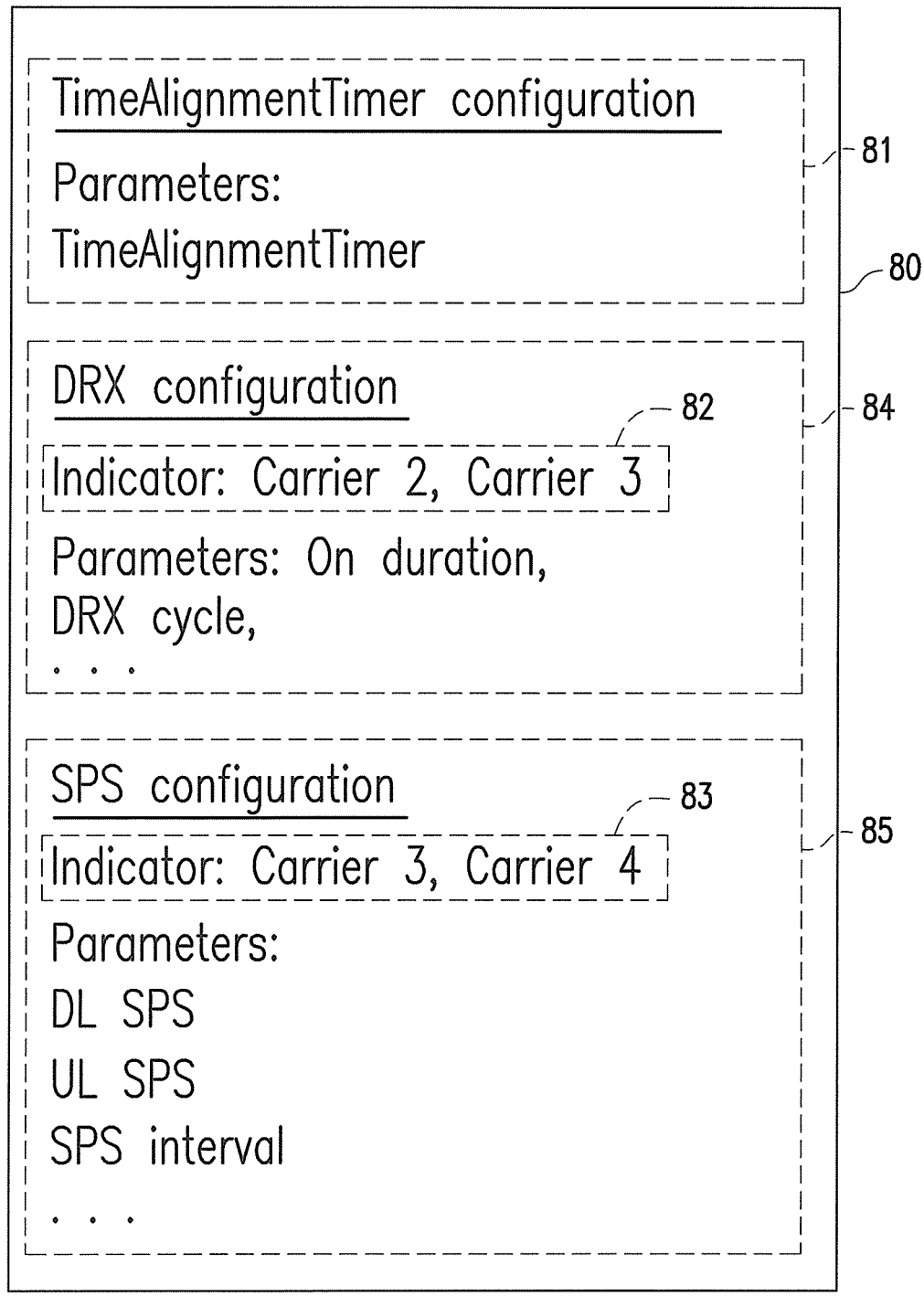
FIG. 8 is a schematic diagram illustrating a CC configuration message according to yet another exemplary embodiment of the disclosure.

Referring to FIG. 8, FIG. 8 is a schematic diagram illustrating a CC configuration message according to yet another exemplary embodiment of the disclosure. In FIG. 8, the CC configuration message 80 includes CC group indicators 82, 83, and configuration parameter data 81, 84, 85. The configuration parameter data 81 does not correspond to any one of the CC group indicators, and the configuration parameter data 81 may be a common configuration parameter data, wherein the terminal set configuration parameters of the configurations of all CCs CC1-CC4 according to the common configuration parameter data. The CC group indicator 82 is disposed behind a description of the configuration type (the DRX configuration) and in front of configuration parameters of the configuration type that are recorded by the configuration parameter data 84. Similarly, the CC group indicator 83 is disposed behind a description of the configuration type (the SPS configuration) and in front of configuration parameters of the configuration type that are recorded by the configuration parameter data 85. The configuration parameter data 84 and 85 respectively correspond to the CC group indicators 82 and 83. In the present exemplary embodiment, the CCs CC2-CC4 use the same time alignment timer configuration, the CCs CC2 and CC3 use the same DRX configuration, and the CCs CC3 and CC4 use the same SPS configuration.

In another exemplary embodiment, since the configuration parameter data 81 does not correspond to any one of the CC group indicators, the terminal may configure the configuration parameters of the configurations of the default CCs (e.g. all of the CCs currently used by the terminal, or primary CCs) according to the configuration parameter data 81. The primary CC is the CC which the terminal primarily uses, and in general, the primary CC may be the CC CC1 for example. In another exemplary embodiment, the terminal may configure the configuration parameters of the configurations of the CCs not indicated by any one of the CC group indicators according to the configuration parameter data 81.

In addition, if the CC configuration message 80 in FIG. 8 merely includes the configuration parameter data 81, but does not comprises the configuration parameter data, 84, 85, and the CC group indicators 82, 83, the terminal set configuration parameters of the configurations of all CCs CC1-CC4 according to the configuration parameter data 81, or the terminal configures the configuration parameters of the configurations of the default CCs according to the configuration parameter data 81.

Figure 9:
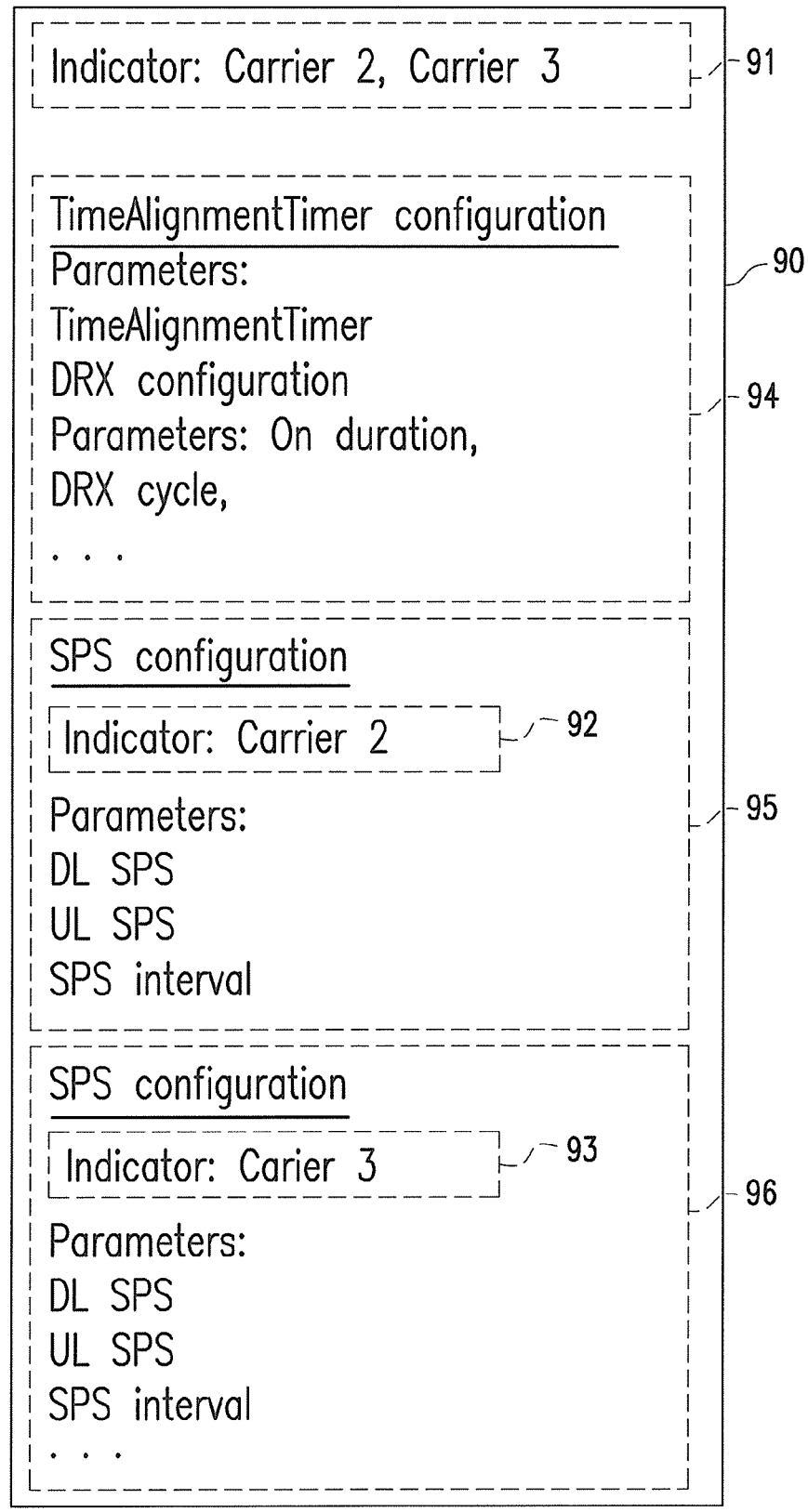
FIG. 9 is a schematic diagram illustrating a CC configuration message according to still another exemplary embodiment of the disclosure.

Referring to FIG. 9, FIG. 9 is a schematic diagram illustrating a CC configuration message according to still another exemplary embodiment of the disclosure. In FIG. 9, the CC configuration message 90 includes CC group indicators 91-93 and configuration parameter data 94-96. The configuration parameter data 94 corresponds to the CC group indicator 91, and the configuration parameter data 95 and 96 respectively correspond to the CC group indicators 92 and 93. In the present exemplary embodiment, the CCs CC2 and CC3 use the same time alignment timer configuration and the DRX configuration, though the CCs CC2 and CC3 use different SPS configurations.

Referring to FIG. 10, FIG. 10 is a schematic diagram illustrating configuration parameter data of a CC configuration message according to another exemplary embodiment of the disclosure. In the present exemplary embodiment, the CC group indicators and the configuration parameter data of the CC configuration message can be separately transmitted. In FIG. 10, the CC group indicators include a first to a fourth CC group indicators, the configuration parameter data include a first to a fourth configuration parameter data A1-A4. The first to the fourth CC groups respectively use the configuration parameters specified by the first to the fourth configuration parameter data A1-A4.

The configuration parameter data of FIG. 10 are arranged in the hierarchy approach. The first CC group is a parent group of the second and the third CC groups, and the CCs of the second and the third CC groups use the same configuration parameters recorded by the first configuration parameter data A1. The CCs of the second and the third CC groups respectively use the configuration parameters recorded by the second and the third configuration parameter data A2 and A3, wherein the configuration parameters recorded by the second and the third configuration parameter data A2 and A3 are the configuration parameters that are not specified by the first configuration parameter data A1, and the configuration parameters recorded by the third configuration parameter data A3 are the configuration parameters that are not specified by the second configuration parameter data A2.

Moreover, the third CC group is a parent group of the fourth CC group, and the CCs of the third and the fourth CC groups use the same configuration parameters recorded by the third configuration parameter data A3. The CCs of the fourth CC group use the configuration parameters recorded by the fourth configuration parameter data A4, wherein the configuration parameters recorded by the fourth configuration parameter data A4 are the configuration parameters that are not specified by the third configuration parameter data A3.

Then, referring to FIG. 11, FIG. 11 is a schematic diagram illustrating configuration parameter data of a CC configuration message according to still another exemplary embodiment of the disclosure. In the present exemplary embodiment, the CC group indicators and the configuration parameter data of the CC configuration message can be separately transmitted. In FIG. 11, the CC group indicators include a first to a third CC group indicators, the configuration parameter data include a first to a third configuration parameter data B1-B3. The first to the third CC groups respectively use the configuration parameters specified by the first to the third configuration parameter data B1-B3.

The configuration parameter data of FIG. 11 are arranged in the hierarchy approach. The first CC group is a parent group of the second and the third CC groups, and the CCs of the second and the third CC groups use the same configuration parameters recorded by the first configuration parameter data B1. The CCs of the second and the third CC groups respectively use different configuration parameters (for example, different values of one of maxHARQ-TX, periodicBST-Timer, RetxBSR-timer and ttiBundling) recorded by the second and the third configuration parameter data B2 and B3, wherein the configuration parameters recorded by the second and the third configuration parameter data B2 and B3 are the configuration parameters that are not specified by the first configuration parameter data B1.

Figure 12:
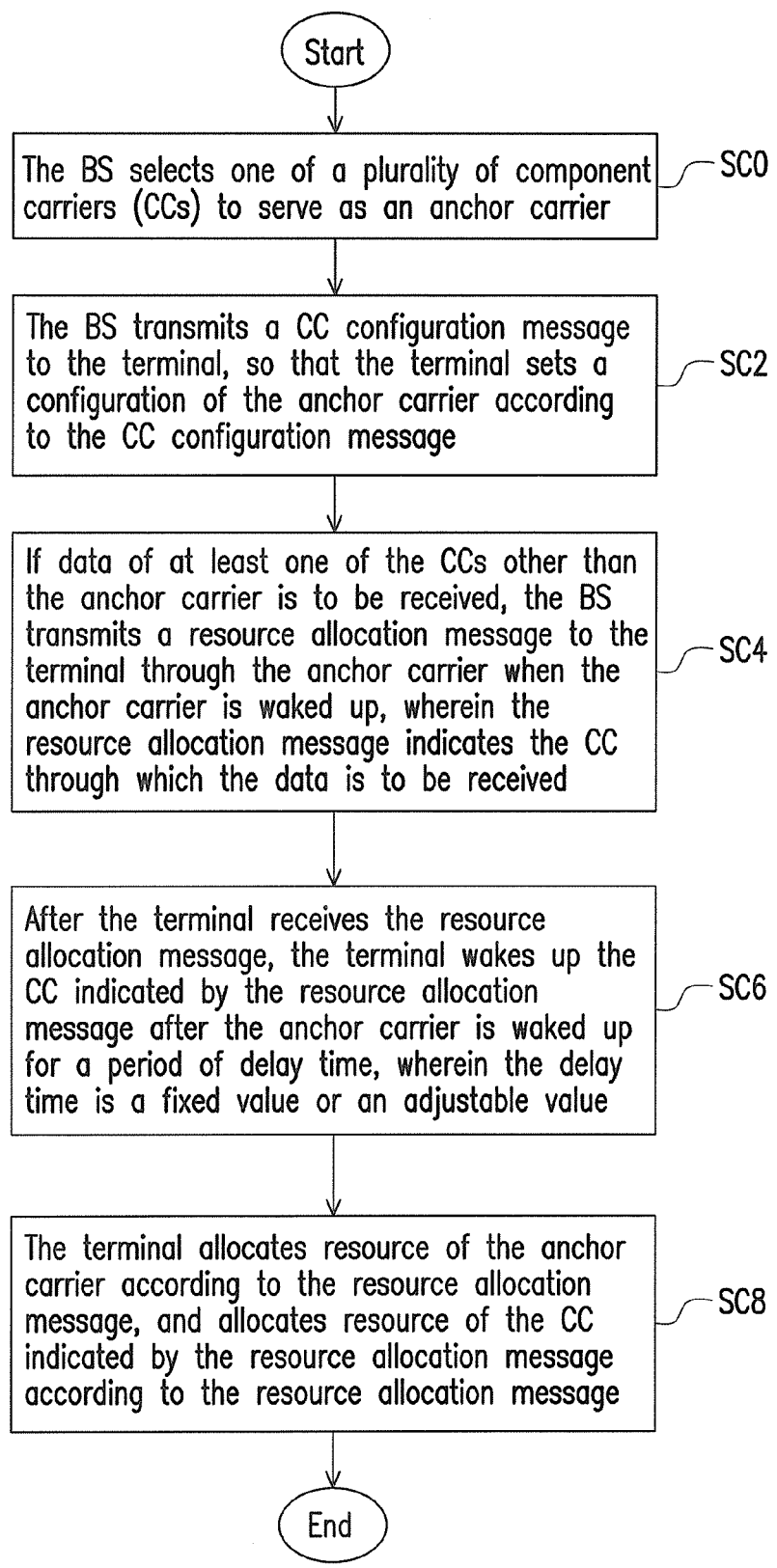
FIG. 12 is a flowchart illustrating a carrier configuration method according to another exemplary embodiment of the disclosure.

Moreover, an exemplary embodiment of the disclosure provides a carrier configuration method based on an anchor carrier having a resource allocation message. Referring to FIG. 12, FIG. 12 is a flowchart illustrating a carrier configuration method according to another exemplary embodiment of the disclosure. In step SC0, the BS selects one of a plurality of CCs to serve as an anchor carrier. In step SC2, the BS transmits a CC configuration message to the terminal, so that the terminal can set the configuration of the anchor carrier according to the CC configuration message. In step SC4, if data of at least one of the CCs other than the anchor carrier is to be received, the BS transmits a resource allocation message to the terminal through the anchor carrier when the anchor carrier is waked up, wherein the resource allocation message indicates the CC of the data to be received.

In step SC6, after the terminal receives the resource allocation message, the terminal wakes up the CC indicated by the resource allocation message after the anchor carrier is waked up for a period of delay time, wherein the delay time is a fixed value or an adjustable value. In step SC8, the terminal allocates the resource of the anchor carrier according to the resource allocation message, and allocates the resource of the CC indicated by the resource allocation message according to the resource allocation message.

Moreover, the configuration of the anchor carrier can be set to the DRX configuration. The terminal can receive a packet through the CC when the CC indicated by the resource allocation message is waked up, and the after the packet is received, the waked-up CC is set to a dormant state.

Figure 13:
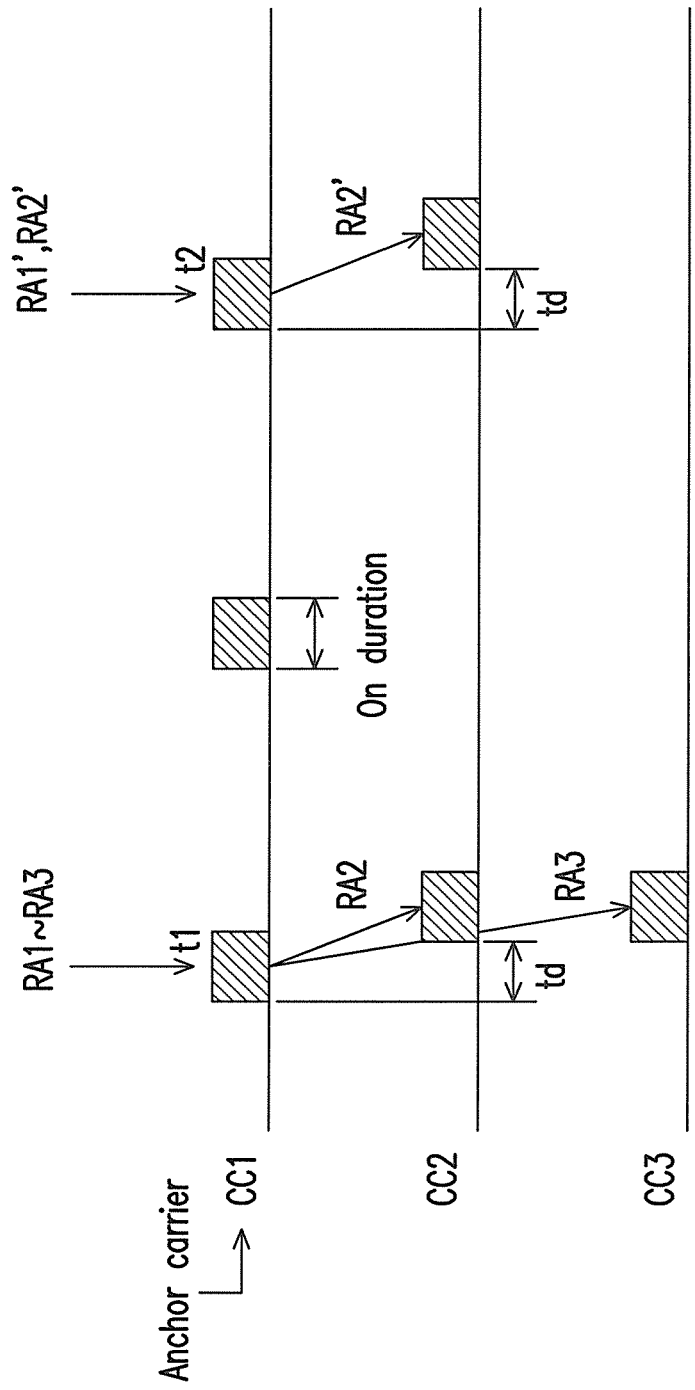
FIG. 13 is a waveform diagram of CCs when a carrier configuration method according to an exemplary embodiment of the disclosure is applied.

Referring to FIG. 13, FIG. 13 is a waveform diagram of CCs of a carrier configuration method according to an exemplary embodiment of the disclosure. In the present exemplary embodiment, the CC CC1 is selected to serve as the anchor carrier, and a configuration of the CC CC1 is set to the DRX configuration. At a time point t1, when the terminal receives a resource allocation message (including messages RA1-RA3 used for allocating resources of the CCs CC1-CC3) through the anchor carrier CC1 as the anchor carrier CC1 is waked-up, the terminal wakes up the CCs CC2 and CC3 after the anchor carrier CC1 is waked up for a period of delay time td, and allocates the resources of the CCs CC1-CC3 according to the resource allocation message. After the resources of the CCs CC1-CC3 are allocated, the terminal receives packets through the CCs CC2 and CC3, and after the packets are received, the waked-up CCs CC2 and CC3 are set to the dormant state.

At a time point t2, when the terminal receives the resource allocation message (including messages RA1' and RA2' used for allocating resources of the CCs CC1 and CC2) through the anchor carrier CC1 as the anchor carrier CC1 is waked-up, the terminal wakes up the CC CC2 after the anchor carrier CC1 is waked up for a period of delay time td, and allocates the resources of the CCs CC1 and CC2 according to the resource allocation message. After the resources of the CCs CC1 and CC2 are allocated, the terminal receives a packet through the CC CC2, and after the packet is received, the waked-up CC CC2 is set to the dormant state. It should be noticed that the anchor carrier CC1 is used for transmitting a physical downlink control channel (PDCCH), and the CCs CC2 and CC3 are used for transmitting a physical downlink shared channel (PDSCH).

In another exemplary embodiment of the disclosure, the BS periodically transmits data to the terminal, and a configuration of the CC used for transmitting data has to be the SPS configuration. In this case, the terminal configures the configuration of the CC indicated by the resource allocation message to the SPS configuration according to the resource allocation message. Moreover, the configuration of the anchor carrier is the DRX configuration at the beginning, though if the terminal receives a new resource allocation message which indicates to change the configuration of the anchor carrier to the SPS configuration, the configuration of the anchor carrier can also be changed to the SPS configuration. Similarly, the SPS configuration of the CC can also be changed according to the new resource allocation message.

Figure 14:
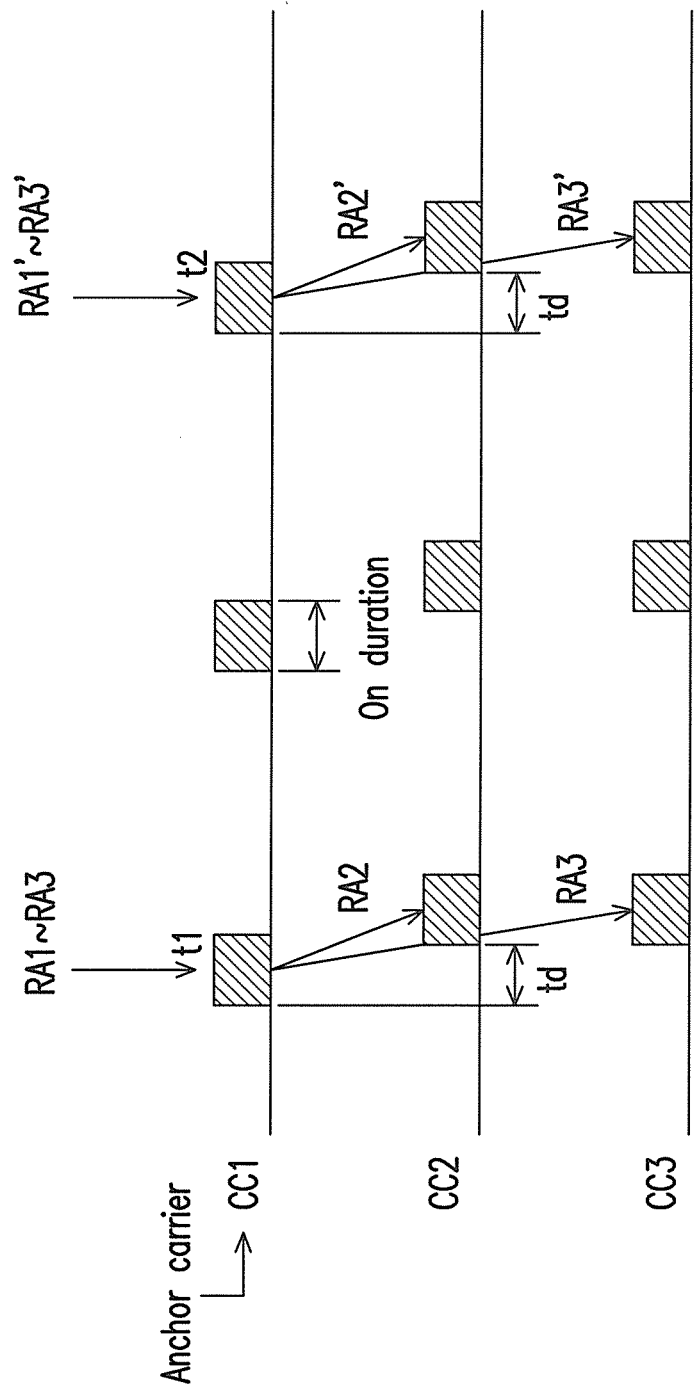
FIG. 14 is a waveform diagram of CCs when a carrier configuration method according to another exemplary embodiment of the disclosure is applied.

Referring to FIG. 14, FIG. 14 is a waveform diagram of CCs of a carrier configuration method according to another exemplary embodiment of the disclosure. In the present exemplary embodiment, the CC CC1 is selected to serve as the anchor carrier, and a configuration of the CC CC1 is set to the DRX configuration. At a time point t1, when the terminal receives a resource allocation message (including messages RA1-RA3 used for allocating resources of the CCs CC1-CC3) through the anchor carrier CC1 as the anchor carrier CC1 is waked-up, the terminal wakes up the CCs CC2 and CC3 after the anchor carrier CC1 is waked up for a period of delay time td, and allocates the resources of the CCs CC1-CC3 according to the resource allocation message, wherein the resource allocation message indicates the terminal to set the configurations of the CCs CC2 and CC3 to SPS configurations, and configuration parameters of the SPS configurations of the CCs CC2 and CC3 can be the same. After the resources of the CCs CC1-CC3 are allocated, the terminal receives packets through the CCs CC2 and CC3, and after the on durations of the CCs CC2 and CC3 are ended, the terminal sets the waked-up CCs CC2 and CC3 to the dormant state.

At a time point t2, when the terminal receives a new resource allocation message (including messages RA1'-RA3' used for allocating resources of the CCs CC1-CC3) through the anchor carrier CC1 as the anchor carrier CC1 is waked-up, if the new resource allocation message indicates to change the DRX configuration of the anchor carrier CC1 to the SPS configuration, the terminal can set the configuration of the anchor carrier CC1 to the SPS configuration. Moreover, the terminal resets the SPS configurations of the CCs CC2 and CC3 according to the new resource allocation message. In the present exemplary embodiment, at the time point t2, the SPS configurations of the anchor carrier CC1 and the CCs CC2 and CC3 are the same, and the SPS configuration at the time point t2 is different to the SPS configuration at the time point t1.

In summary, according to the carrier configuration method of the disclosure, the CCs using at least one identical configuration parameter are divided into the same CC group, and the BS can transmit the CC configuration message to the terminal, so that the terminal can set the configuration parameters of each CC in the CC group while taking the CC group as a unit. In this way, a size and amount of the CC configuration message transmitted between the BS and the terminal can be reduced. Moreover, an exemplary embodiment of the disclosure further provides a carrier configuration method based on the anchor carrier having a resource allocation message, by which the terminal can wake up the CC through which the data is to be received according to the resource allocation message. In this way, a size of the notification message transmitted between the BS and the terminal is reduced. Besides, the above carrier configuration methods can also be applied to a 3GPP system, for example, UMTS, LTE or LTE-A, etc.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A carrier configuration method for a multi-carrier communication system having a base station (BS) and a terminal, the carrier configuration method comprising:

dividing a plurality of component carriers (CCs) of the terminal to a plurality of CC groups by the BS, wherein the CCs using at least one identical configuration parameter are divided into the same CC group;

transmitting a CC configuration message to the terminal by the BS, wherein the CC configuration message comprises at least one configuration parameter data, and comprises or does not comprise at least one CC group indicator, the CC group indicator indicates the CCs of the same CC group, and corresponds to at least the configuration parameter data; and receiving the CC configuration message by the terminal, if the CC configuration message comprises the CC group indicator, configuring the configuration parameter of configurations of the CCs indicated by the CC configuration indicator according to the configuration parameter data by the terminal, if the CC configuration message does not comprise the CC group indicator, configuring the configuration parameter of configurations of default CCs according to the configuration parameter data by the terminal.

2. The carrier configuration method as claimed in claim 1, wherein the CC group indicator uses a plurality of CC identifiers to indicate the CCs of the same CC group.

3. The carrier configuration method as claimed in claim 1, wherein the CC group indicator uses a bitmap to indicate the CCs of the same CC group.

4. The carrier configuration method as claimed in claim 1, wherein the CCs are divided in more than at least one CC group, and the CC configuration message comprises a plurality of CC group indicators and a plurality of configuration parameter data corresponding to the CC group indicators, and the terminal configures the configuration parameter of configurations of the CCs indicated by the corresponding CC configuration indicator according to each of the configuration parameter data.

5. The carrier configuration method as claimed in claim 1, wherein the configuration parameter data comprises a difference between a current configuration parameter and a previous configuration parameter.

6. The carrier configuration method as claimed in claim 5, wherein if the difference between the current configuration parameter and the previous configuration parameter is 0, the difference between the current configuration parameter and the previous configuration parameter is not included in the configuration parameter data.

7. The carrier configuration method as claimed in claim 5, wherein an initial value of the previous configuration parameter is 0, and meanwhile the difference between the current configuration parameter and the previous configuration parameter is an absolute value of the current configuration parameter.

8. The carrier configuration method as claimed in claim 1, wherein the configuration parameter data comprises an absolute value of a current configuration parameter.

9. The carrier configuration method as claimed in claim 8, wherein if there is no difference between the current configuration parameter and a previous configuration parameter, the absolute value of the current configuration parameter is not included in the configuration parameter data.

10. The carrier configuration method as claimed in claim 1, wherein the CC group indicator and the configuration parameter data are separately transmitted at different time and/or through different channels.

11. The carrier configuration method as claimed in claim 1, wherein the CC configuration message further comprises a common configuration parameter data, the terminal configures a common configuration parameter of configurations of all of the CCs according to the common configuration parameter data.

12. The carrier configuration method as claimed in claim 11, wherein in the CC configuration message, the common configuration parameter data is disposed in front of the CC group indicator, and the configuration parameter data corresponding to the CC group indicator is disposed behind the CC group indicator.

13. The carrier configuration method as claimed in claim 1, wherein the CCs of the same CC group use a same first configuration parameter, and the CCs of the same CC group use different second configuration parameters.

14. The carrier configuration method as claimed in claim 1, wherein the CC configuration message comprises a plurality of a plurality of CC group indicators and a plurality of configuration parameter data corresponding to the CC group indicators, the CC group indicators and the plurality of configuration parameter data are arranged in a hierarchy approach, and the terminal configures the configuration parameters of configurations of the CCs indicated by the CC configuration indicators according to the configuration parameter data based on the hierarchy approach.

15. The carrier configuration method as claimed in claim 1, wherein the CC configuration message comprises a first and a second CC group indicators and a first and a second configuration parameter data respectively corresponding to the first and the second CC group indicators, wherein the second configuration parameter data records a difference of a configuration parameter, and the difference is a value between the configuration parameter of the second configuration parameter data and the corresponding configuration parameter of the first configuration parameter data.

16. The carrier configuration method as claimed in claim 15, wherein if the difference is 0, the difference is not included in the second configuration parameter data.

17. The carrier configuration method as claimed in claim 1, wherein the CC configuration message comprises a first through $x^{th}$ CC group indicators and a first through $x^{th}$ configuration parameter data respectively corresponding to the first through $x^{th}$ CC group indicators, x is an integer larger than or equal to 2, wherein the second through $x^{th}$ configuration parameter data record an absolute value of the at least one configuration parameter that is not recorded by the first configuration parameter data or at least one different configuration parameter.

18. The carrier configuration method as claimed in claim 1, wherein the CC configuration message comprises a second through $x^{th}$ CC group indicators, a first configuration parameter data, and a second through $x^{th}$ configuration parameter data respectively corresponding to the second through $x^{th}$ CC group indicators, x is an integer larger than or equal to 2, wherein the second through $x^{th}$ configuration parameter data record an absolute value of the at least one configuration parameter that is not recorded by the first configuration parameter data or at least one different configuration parameter, and the terminal configures the configuration parameter of configurations of default CCs according to the first configuration parameter data.

19. A carrier configuration method for a multi-carrier communication system having a base station (BS) and a terminal, the carrier configuration method comprising:
  selecting one of a plurality of component carriers (CCs) to serve as an anchor carrier by the BS;
  transmitting a first CC configuration message to the terminal by the BS, so that the terminal sets a configuration of the anchor carrier according to the first CC configuration message;
  when data of at least one of the CCs other than the anchor carrier is to be received, transmitting a first resource allocation message to the terminal through the anchor carrier by the BS, wherein the first resource allocation message indicates the CC through which the data is to be received; and
  after the terminal receives the first resource allocation message, if the first resource allocation message includes a second CC configuration message, setting a configuration of the CC indicated by the first resource allocation message by the terminal after beginning of a first on duration configured on the anchor carrier for a period of delay time.

20. The carrier configuration method as claimed in claim 19, further comprising:
if the first resource allocation message includes a first resource allocation information of the anchor carrier, receiving a first packet according to the first resource allocation information of the anchor carrier by the terminal; and
if the first resource allocation message includes a second resource allocation information of the CC indicated by the first resource allocation message, receiving a second packet according to the second resource allocation information of the CC by the terminal after a delay time from receiving the first resource allocation message.

21. The carrier configuration method as claimed in claim 19, wherein if the first CC configuration message includes a discontinuous reception (DRX) configuration, the terminal starts to receive the first resource allocation message through the anchor carrier during the first on duration which is configured in the DRX configuration.

22. The carrier configuration method as claimed in claim 20, wherein after the second packet is received, the terminal stops receiving through the CC until a second resource allocation message is received.

23. The carrier configuration method as claimed in claim 19, wherein if the second CC configuration message includes a first semi-persistent scheduling (SPS) configuration, the terminal starts to receive a packet through the CC indicated by the first resource allocation message according to the first SPS configuration.

24. The carrier configuration method as claimed in claim 23, further comprising:
when the terminal receives a second resource allocation message and the second resource allocation message includes a second SPS configuration, the terminal sets a configuration of the CC indicated by the second resource allocation message according to the second SPS configuration.

25. The carrier configuration method as claimed in claim 19, wherein if the second CC configuration message includes a DRX configuration, the terminal starts to receive a packet through the CC indicated by the first resource allocation message during a second on duration which is configured in the DRX configuration.

26. The carrier configuration method as claimed in claim 20, wherein the delay time is a fixed value or an adjustable value.

* * * * *